(12) United States Patent
Yan et al.

(10) Patent No.: US 10,259,742 B2
(45) Date of Patent: Apr. 16, 2019

(54) OPTICAL FIBER WITH LOW LOSS AND NANOSCALE STRUCTURALLY HOMOGENEOUS CORE

(71) Applicant: OFS Fitel, LLC, Norcross, GA (US)

(72) Inventors: Man F. Yan, Berkeley Heights, NJ (US); Peter I. Borel, Frederiksberg (DK); Tommy Geisler, Brondby (DK); Rasmus V. S. Jensen, Frederiksberg (DK); Ole A. Levring, Virum (DK); Jorgen Ostgaard Olsen, Copenhagen (DK); David W. Peckham, Lawrenceville, GA (US); Dennis J. Trevor, Clinton, NJ (US); Patrick W. Wisk, Greenbrook, NJ (US); Benyuan Zhu, Princeton, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/886,982

(22) Filed: Feb. 2, 2018

(65) Prior Publication Data

US 2018/0251397 A1    Sep. 6, 2018

Related U.S. Application Data

(63) Continuation of application No. 15/086,169, filed on Mar. 31, 2016, now Pat. No. 9,919,955.

(Continued)

(51) Int. Cl.
*G02B 6/36* (2006.01)
*C03C 13/04* (2006.01)
*C03B 37/012* (2006.01)
*C03C 3/06* (2006.01)
(Continued)

(52) U.S. Cl.
CPC ...... *C03C 13/046* (2013.01); *C03B 37/01208* (2013.01); *C03B 37/01853* (2013.01);
(Continued)

(58) Field of Classification Search
CPC .............. G02B 6/03627; G02B 6/0365; G02B 6/02042; C03C 13/046; C03C 13/045; C03C 3/06; C03C 2201/28; C03C 4/10
See application file for complete search history.

(56) References Cited

U.S. PATENT DOCUMENTS

| 4,975,102 A | * | 12/1990 | Edahiro | ................ C03B 37/014 385/127 |
| 5,033,815 A | * | 7/1991 | Edahiro | ................ C03B 37/014 385/141 |

(Continued)

*Primary Examiner* — Thomas A Hollweg
*Assistant Examiner* — Mary A El-Shammaa
(74) *Attorney, Agent, or Firm* — Dan Kim-Jaabs + Kim LLP

(57) ABSTRACT

An optical fiber has a core region that is doped with one or more viscosity-reducing dopants in respective amounts that are configured, such that, in a Raman spectrum with a frequency shift of approximately 600 cm$^{-1}$, the fiber has a nanoscale structure having an integrated D2 line defect intensity of less than 0.025. Alternatively, the core region is doped with one or more viscosity-reducing dopants in respective amounts that are configured such that the fiber has a residual axial compressive stress with a stress magnitude of more than 20 MPa and a stress radial extent between 2 and 7 times the core radius.

According to another aspect of the invention a majority of the optical propagation through the fiber is supported by an identified group of fiber regions comprising the core region and one or more adjacent cladding regions. The fiber regions are doped with one or more viscosity-reducing dopants in respective amounts and radial positions that are configured to achieve viscosity matching among the fiber regions in the identified group.

17 Claims, 13 Drawing Sheets

Related U.S. Application Data

(60) Provisional application No. 62/196,465, filed on Jul. 24, 2015.

(51) Int. Cl.
*C03C 4/10* (2006.01)
*C03B 37/027* (2006.01)
*G02B 6/036* (2006.01)
*C03B 37/018* (2006.01)

(52) U.S. Cl.
CPC .............. *C03B 37/027* (2013.01); *C03C 3/06* (2013.01); *C03C 4/10* (2013.01); *C03C 13/045* (2013.01); *G02B 6/0365* (2013.01); *G02B 6/03627* (2013.01); *C03B 2201/07* (2013.01); *C03B 2201/08* (2013.01); *C03B 2201/12* (2013.01); *C03B 2201/20* (2013.01); *C03B 2201/28* (2013.01); *C03B 2201/50* (2013.01); *C03B 2203/223* (2013.01); *C03B 2203/23* (2013.01); *C03C 2201/11* (2013.01); *C03C 2201/12* (2013.01); *C03C 2201/28* (2013.01); *C03C 2201/50* (2013.01); *Y02P 40/57* (2015.11)

(56) References Cited

U.S. PATENT DOCUMENTS

| | | | |
|---|---|---|---|
| 7,088,900 B1 * | 8/2006 | Mishra | C03C 3/06 385/123 |
| 2002/0176677 A1 * | 11/2002 | Kumar | C03B 37/01222 385/126 |
| 2004/0226319 A1 * | 11/2004 | MacChesney | C03B 37/0128 65/390 |
| 2004/0240814 A1 * | 12/2004 | Boek | C03B 37/01446 385/123 |
| 2005/0063663 A1 * | 3/2005 | Anderson | C03B 37/01211 385/142 |
| 2005/0129376 A1 * | 6/2005 | Hanson | C03B 37/01446 385/123 |
| 2006/0130530 A1 | 6/2006 | Anderson et al. | |
| 2007/0297735 A1 | 12/2007 | Khrapko et al. | |
| 2008/0050086 A1 | 2/2008 | Bickham et al. | |
| 2008/0271495 A1 * | 11/2008 | Balakrishnan | C03B 37/01853 65/421 |
| 2008/0279515 A1 * | 11/2008 | Bickham | G02B 6/02333 385/123 |
| 2011/0058780 A1 * | 3/2011 | Han | C03B 37/018 385/124 |
| 2012/0263427 A1 * | 10/2012 | Hirano | C03B 37/01211 385/142 |
| 2013/0114935 A1 * | 5/2013 | Bookbinder | G02B 6/0288 385/124 |
| 2014/0185996 A1 * | 7/2014 | Zhang | G02B 6/0365 385/124 |
| 2014/0248026 A1 * | 9/2014 | Yang | G02B 6/03605 385/127 |
| 2014/0370287 A1 | 12/2014 | Tamura et al. | |
| 2015/0027170 A1 | 1/2015 | Haruna et al. | |
| 2015/0098682 A1 | 4/2015 | Tamura et al. | |
| 2016/0170137 A1 * | 6/2016 | Borel | C03B 37/01446 385/127 |
| 2017/0022094 A1 * | 1/2017 | Yan | C03B 37/01208 |

* cited by examiner

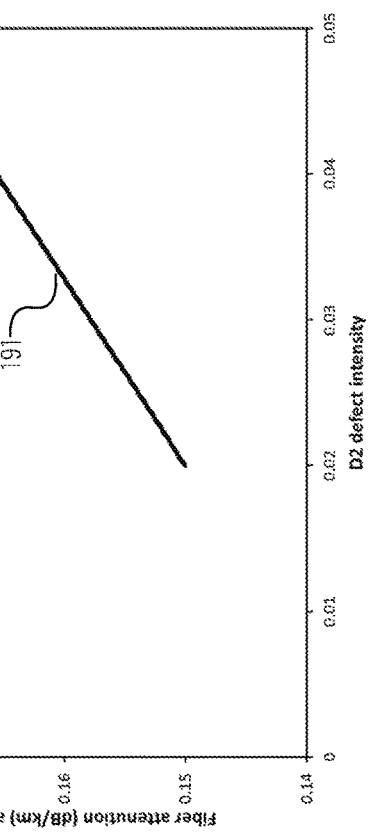
FIG. 11
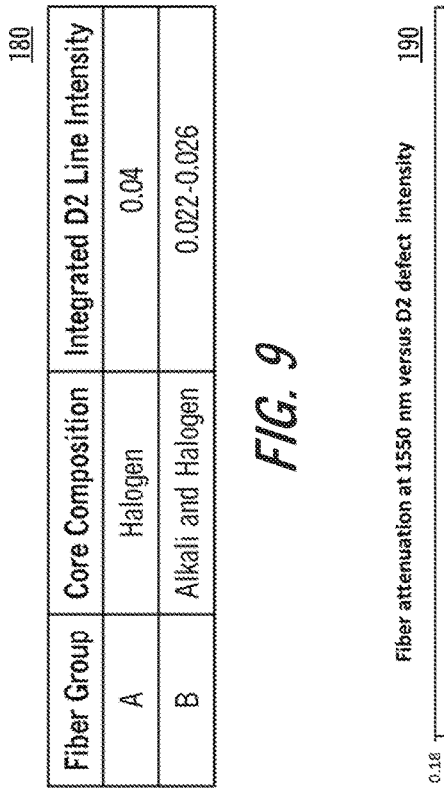
FIG. 9
FIG. 10

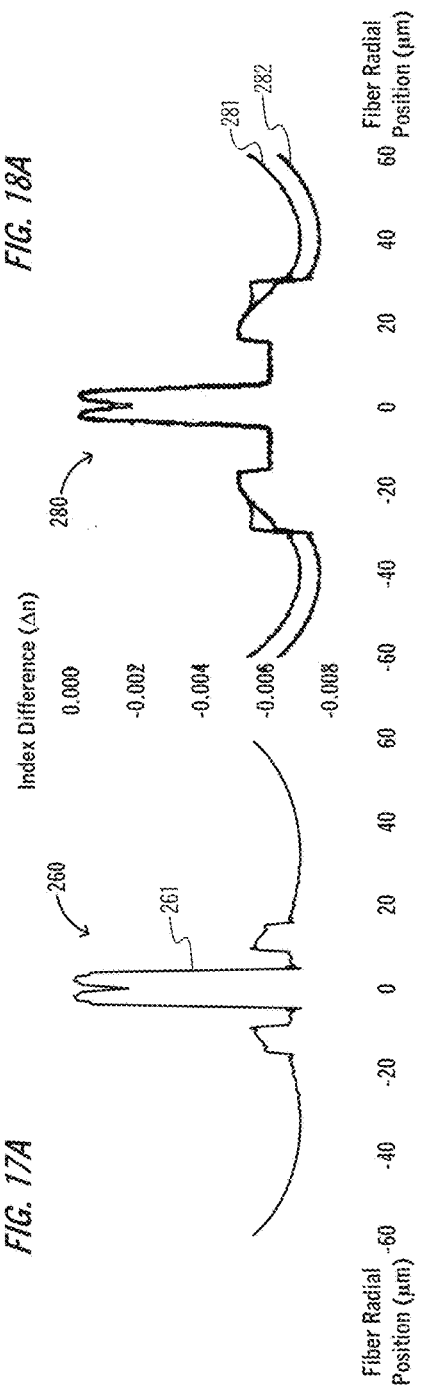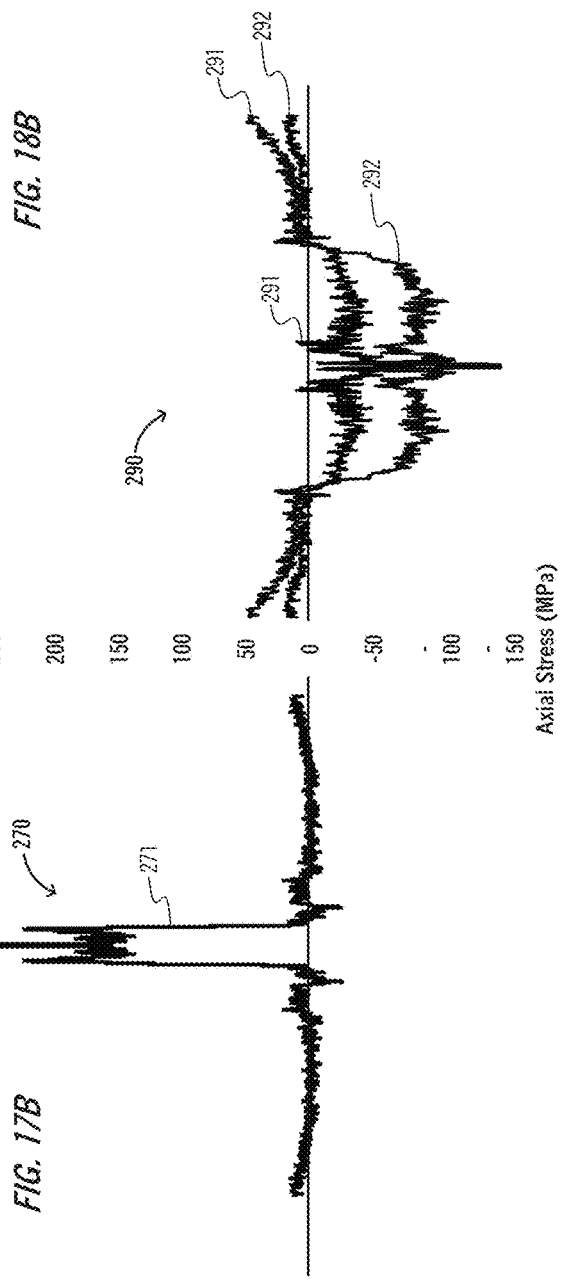

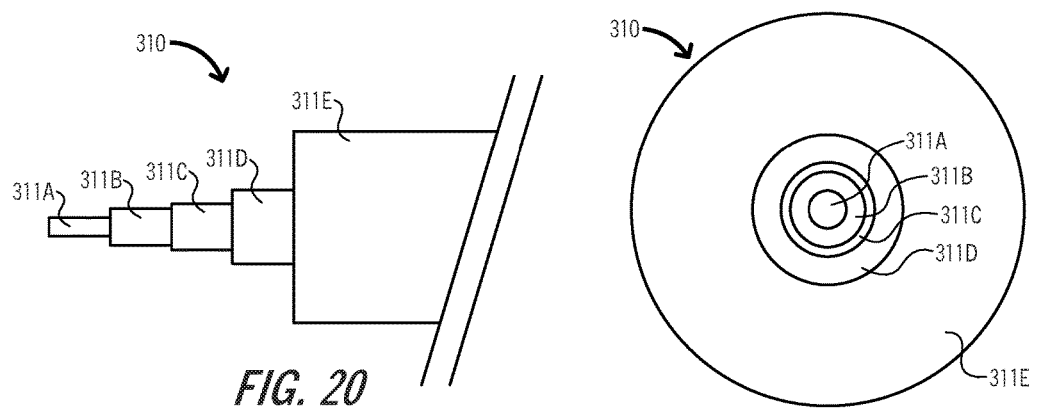
FIG. 20
FIG. 21
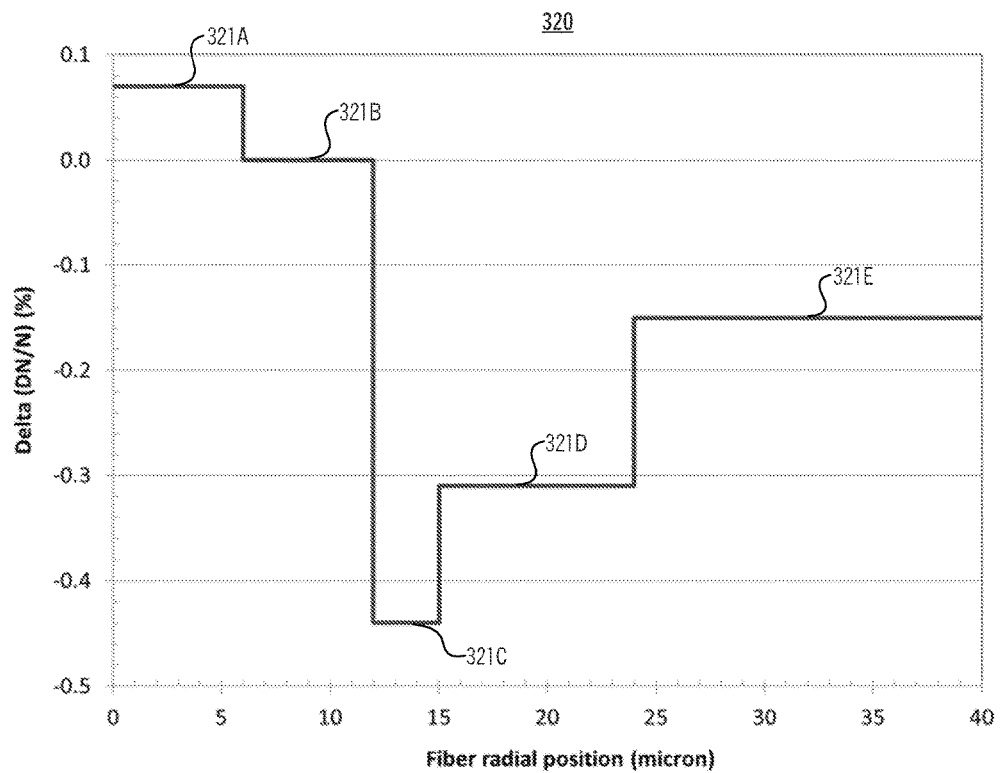
FIG. 22

330

| Region | Name | Outer Radius (μm) | Index Difference (Δn) | Viscosity* Before Alkali Doping | Alkali Doping Scheme #1 | Alkali Doping Scheme #2 |
|---|---|---|---|---|---|---|
| 311A | Core | 6 | 0.70 | 3 | Trace Alkali | Alkali-Doping |
| 311B | Pedestal | 12 | 0.00 | 5 | Alkali Doping | Alkali-Doping |
| 311C | Inner Trench | 15 | -0.44 | 1 | Trace / No Alkali | Trace Alkali |
| 311D | Outer Trench | 24 | -0.31 | 2 | No Alkali Doping | No Alkali Doping |
| 311E | Cladding | 62.5 | -0.15 | 3 | No Alkali Doping | No Alkali Doping |

*Viscosity Ranking: Low=1; High=5

| No. | Alkali | | | Halogen | | Phosphorus (P) |
|---|---|---|---|---|---|---|
| | Sodium (Na) | Potassium (K) | Rubidium (Rb) | Fluorine (F) | Chlorine (Cl) | |
| 1 | | | | 0 to 150,000 ppm | 0 to 15,000 ppm | 0.2 to 2% |
| 2 | | 5 to 2,000 ppm | | | 100 to 15,000 ppm | 0 to 2% |
| 3 | | | 5 to 2,000 ppm | | 100 to 15,000 ppm | 0 to 2% |
| 4 | 5 to 2,000 ppm | | | 100 to 15,000 ppm | | 0 to 2% |

FIG. 24

OPTICAL FIBER WITH LOW LOSS AND NANOSCALE STRUCTURALLY HOMOGENEOUS CORE

CROSS REFERENCE TO RELATED APPLICATIONS

The present application is a continuation of co-pending U.S. patent application Ser. No. 15/086,169, filed on Mar. 31, 2016.

U.S. patent application Ser. No. 15/086,169, filed on Mar. 31, 2016, claims the priority benefit of U.S. Provisional Patent Application Ser. No. 62/196,465, filed on Jul. 24, 2015.

The above applications are owned by the assignee of the present application, and are incorporated herein by reference in their entirety.

BACKGROUND OF THE INVENTION

Field of the Invention

The present invention relates generally to the field of fiber optics, and in particular to an improved optical fiber with low loss and a nanoscale structurally homogeneous core.

Background Art

Due to the rapid spread of Internet services, the demand is increasing exponentially for low-loss optical fibers that are capable of transmitting large amounts of data over long distances.

Core homogeneity has a significant impact on optical transmission performance. Current production fibers have cores that are doped with germanium (Ge) and typically have an attenuation that is above 0.18 dB/km. Such high attenuation is due to scattering from Ge-dopant as well as nanoscale crystalline defects. While fibers with a Ge-free core can remove one source of attenuation, it is important to reduce the nanoscale crystalline defect concentration in the fiber core to further reduce attenuation to below 0.18 dB/km.

It is possible to reduce the concentration of nanoscale crystalline defects by lowering the speed at which the fiber is drawn. However, the use of a lower draw speed increases the amount of time required to fabricate a fiber, resulting in increased manufacturing costs.

SUMMARY OF INVENTION

These and other issues are addressed by aspects of the present invention, aspects of which are directed to an optical fiber with low loss and a nanoscale structurally homogeneous core.

According to one aspect of the invention, an optical fiber comprises a plurality of concentric fiber regions, including a core region and surrounding cladding regions, wherein the concentric fiber regions are doped with one or more index-modifying dopants in respective amounts and radial positions that are configured to create a selected index profile. The core region is doped with one or more viscosity-reducing dopants in respective amounts that are configured, such that, in a Raman spectrum with a frequency shift of approximately 600 $cm^{-1}$, the fiber has a nanoscale structure having an integrated D2 line defect intensity of less than 0.025.

According to a further aspect of the invention, the core region is doped with one or more viscosity-reducing dopants in respective amounts that are configured such that the fiber has a residual axial compressive stress with a stress magnitude of more than 20 MPa and a stress radial extent between 2 and 7 times the core radius.

According to another aspect of the invention a majority of the optical propagation through the fiber is supported by an identified group of fiber regions comprising the core region and one or more adjacent cladding regions. The fiber regions are doped with one or more viscosity-reducing dopants in respective amounts and radial positions that are configured to achieve viscosity matching among the fiber regions in the identified group.

BRIEF DESCRIPTION OF THE DRAWINGS

FIG. 9 shows a table showing the integrated D2 line intensity in the two groups of fibers of FIGS. 7 and 8.

FIG. 10 shows a graph illustrating the general correlation between fiber attenuation at 1550 nm and D2 defect line intensity.

FIG. 11 shows a table that lists the ionic radius and charge for alkalis and halogens.

FIG. 17A shows refractive index as a function of radial position in an alkali-free fiber.

FIG. 17B shows the fiber's axial stress profile as a function of radial position.

FIG. 18A shows refractive index as a function of radial position in which K-dopant was deposited in the center of the preform from which the fiber was drawn. FIG. 18B shows the fiber's axial stress profile as a function of radial position.

FIGS. 20 and 21 show, respectively, side and front views an optical fiber according to a further aspect of the invention.

FIG. 22 shows an index profile for the fiber shown in FIGS. 20 and 21.

FIG. 23 shows a table setting forth a number of parameters and doping schemes for the fiber shown in FIGS. 20 and 21.

FIG. 24 shows a table that sets forth exemplary core doping schemes in accordance with various aspects of the invention.

DETAILED DESCRIPTION

The invention is directed to low-loss optical fibers that display a high degree of core homogeneity, and techniques for manufacturing such fibers. Exemplary practices of the invention, described below, provide fiber designs that can achieve an attenuation of 0.18 dB/km or lower at 1550 nm, even when drawn at speeds of 3 meters per second or greater.

According to an aspect of the invention, the above fiber characteristics are obtained by doping the core region of a fiber preform according to a dopant scheme that includes one or more viscosity-reducing dopants. In a number of practices of the invention described below, an alkali is used as a viscosity-reducing dopant. As discussed below, the viscosity-reducing properties of an alkali dopant added only to the core region of a fiber preform extend beyond the core region, and result in a significant reduction in the formation of nanocrystalline defects as the preform is drawn into fiber.

Figure 1:
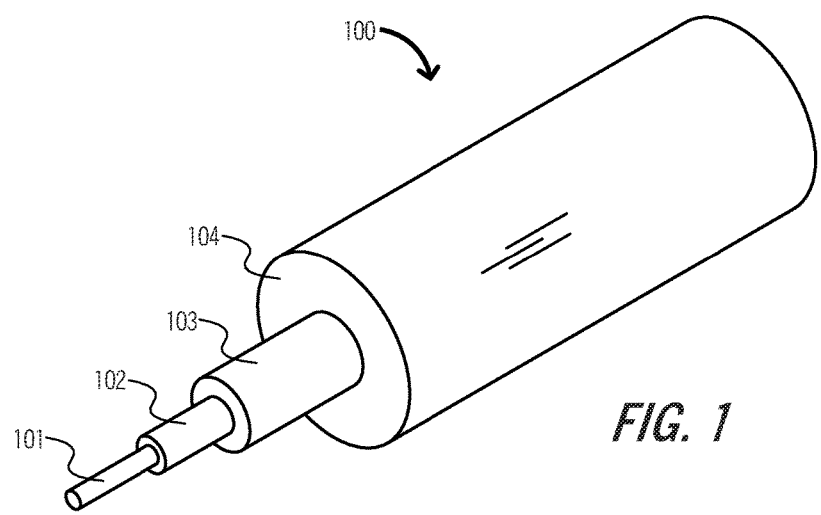
FIG. 1 shows an isometric view of an exemplary step-index optical fiber.

FIG. 1 shows a diagram of an exemplary step-index optical fiber 100, which provides context for the present discussion. It will be appreciated that the techniques described herein are applicable to other fiber designs.

Fiber 100 is fabricated from silica ($SiO_2$) to which chemical dopants have been added to create a plurality of concentric regions, each of which is characterized by a respective refractive index. Fiber 100 comprises a core region 101, an inner trench region 102, a shoulder region 103, and an outer cladding region 104.

Figure 2:
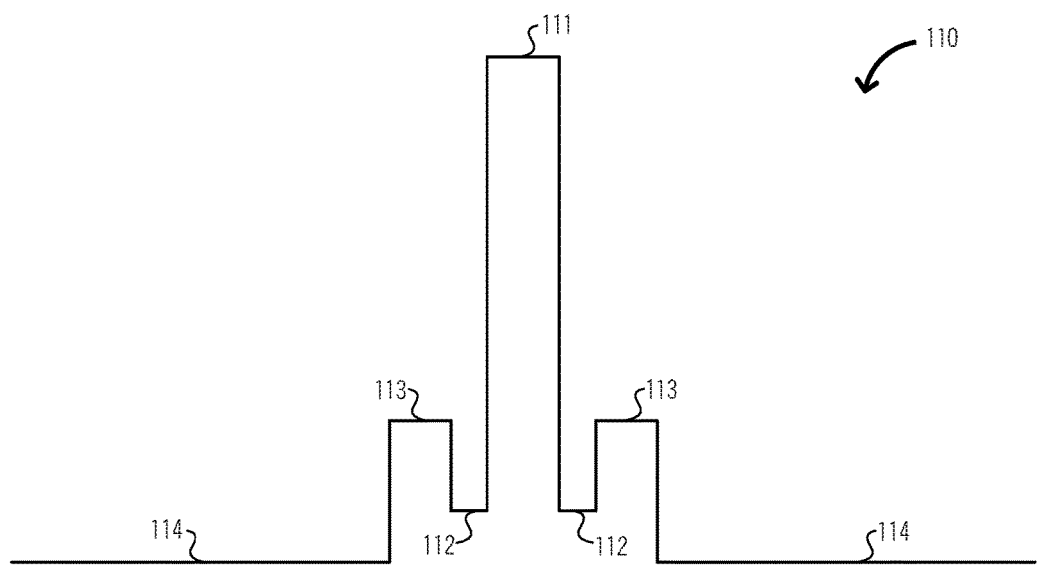
FIG. 2 shows a refractive index profile for the fiber shown in FIG. 1.

FIG. 2 shows an exemplary refractive index profile 110 for fiber 100, showing an up-doped core 111, down-doped trenches 112, up-doped shoulders 113, and down-doped outer cladding region 114. It is noted that in a step-index fiber design, refractive index is commonly expressed using the fractional refractive index difference $\Delta n_{region}$:

$$\Delta n_{region} = \frac{n_{region} - n_0}{n_{region}}$$

where $n_{region}$ is the refractive index of a given fiber region, and $n_0$ is a reference refractive index (typically the refractive index of undoped silica).

For the purposes of the present discussion, it is assumed that a modified chemical vapor deposition (MCVD) technique is used to fabricate fiber 100. However, it will be apparent that the aspects of the invention described herein are generally applicable to other fiber manufacturing techniques.

In an MCVD technique, a large-diameter silica-based substrate tube is loaded into a lathe and is continuously rotated around its longitudinal axis. As the tube is rotated, layers of chemical soot are deposited onto the tube's inner circumference. Each preform region (corresponding to a respective fiber region) is built layer by layer, with chemical dopants added as required.

Figure 3:
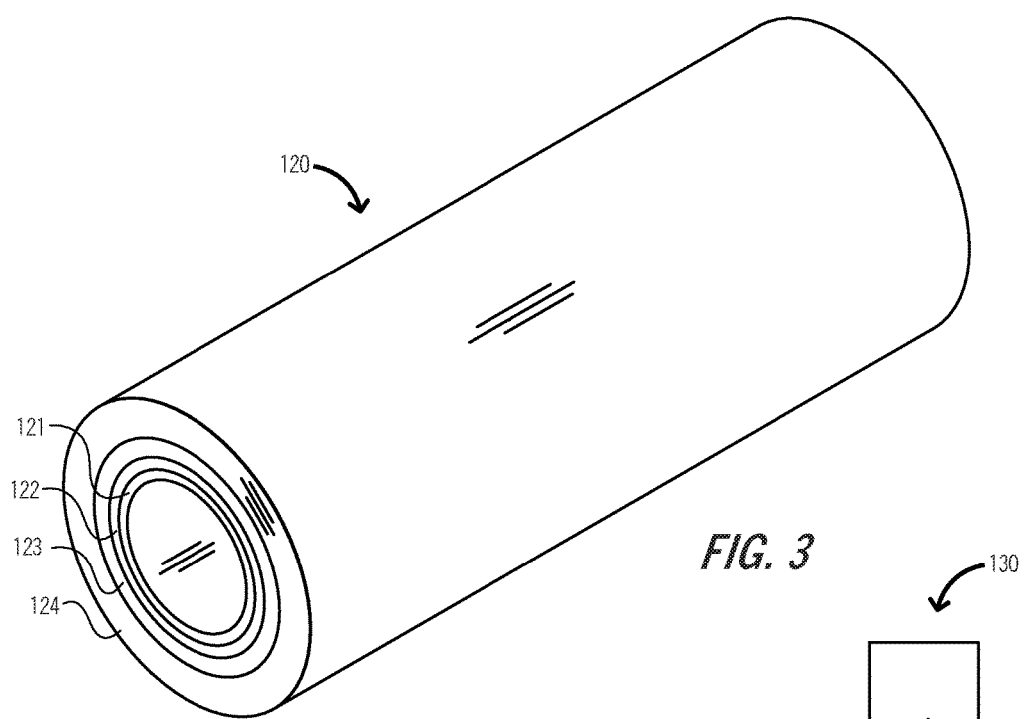
FIG. 3 shows an isometric view of a substrate tube having an inner circumference onto which have been deposited a series of layers of chemical soot, in accordance with a modified chemical vapor deposition technique.

FIG. 3 shows an isometric diagram of an MCVD preform 120, prior to sintering and consolidation. Preform regions 121, 122, and 123, corresponding respectively to the core 101, inner trench 102, and shoulder 103 of fiber 100, have been built layer by layer onto the inner circumference of substrate tube 124, which corresponds to the outer cladding 104 of fiber 100. It is noted that preform region 123 is built first and that the core region of the preform 121 is built last.

Figure 4:
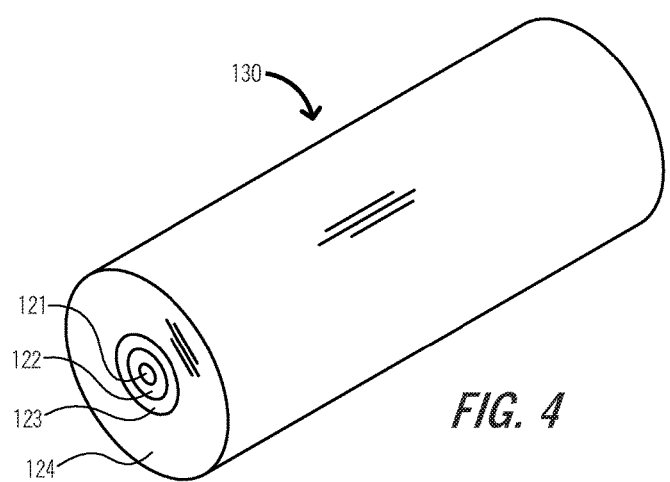
FIG. 4 shows an isometric view of a preform resulting from the sintering and consolidation of the substrate tube shown in FIG. 3.

After all the preform regions have been formed, the substrate tube is heated to cause the soot layers to sinter, and to cause the tube and soot layers to be fused and consolidated into a cylindrical preform 130, shown in FIG. 4. As illustrated schematically in FIG. 5, the preform 130 is then loaded into a draw tower and drawn into an optical fiber 140 having a core and surrounding regions that correspond to preform regions 131, 132, 133, and 134 (FIG. 4) (and that also correspond to soot regions 121, 122, 123 and substrate tube 124 in FIG. 3). As indicated by weight symbol 141 and arrow 142, a controlled tension is applied to the fiber 140 as it is being drawn.

Figure 5:
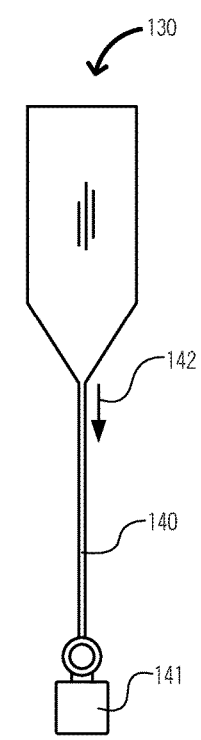
FIG. 5 shows a diagram illustrating the drawing of a fiber from the preform shown in FIG. 4.

As discussed below, the fiber drawing process illustrated in FIG. 5, when used in conjunction with prior doping schemes, results in a relatively high concentration of nanocrystalline defects in the drawn fiber, which in turn leads to a relatively high level of attenuation.

Aspects of the present invention are directed to doping schemes that result in an optical fiber having the following characteristics:

(a) a nanoscale structurally homogenous core;
(b) an extensive compressive axial stress in the fiber core and adjacent regions; and
(c) viscosity matching among the fiber's radial regions supporting a large percentage of optical propagation through the fiber.

The theoretical basis of the invention is set forth below, followed by a description of a number of exemplary practices of the invention.

Figure 6:
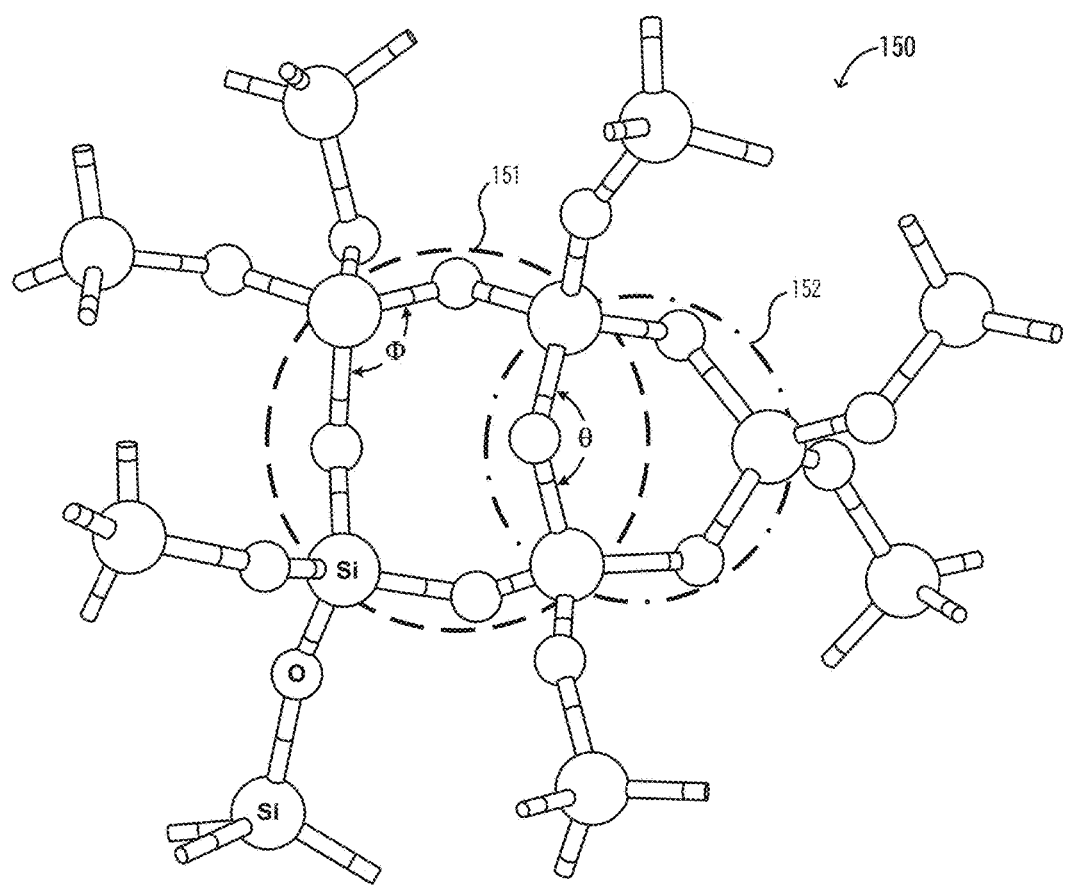
FIG. 6 is a three-dimensional schematic of an exemplary silica molecular network.

FIG. 6 is a three-dimensional schematic of an exemplary silica molecular network 150. Nanocrystalline defects result from the formation of 4-fold and 3-fold ring structures 151, 152 within the otherwise amorphous network. These ring structural defect structures were reported by A. E. Geissberger and F. L. Galeener in "Raman studies of vitreous $SiO_2$ versus fictive temperature," Phys. Rev. B, vol. 28, no. 6, pp. 3266-3271 (1983), and illustrated in FIG. 1 from Vukelic et al., "Structural Modification of Amorphous Fused Silica Under Femtosecond Laser Irradiation," ASME 2008 International Manufacturing Science and Engineering Conference, vol. 1, Evanston, Ill., USA, Oct. 7-10, 2008.

Within these ring structure, the O—Si—O bond angles ($\phi$) are approximately 102°, which is smaller than the bond angles of approximately 109° in the near-perfect $SiO_4$ tetrahedrons. The distortion of the $SiO_4$ tetrahedrons to form the smaller O—Si—O bond angles results from strain energy that is introduced during the draw process and that is stored in the defect structures as the fiber cools.

The presence of nanocrystalline defects within an optical fiber can be quantified using Raman spectroscopy. A Raman spectrum measured in the core of an optical fiber is relatively broad due to the amorphous nature of the silica network. Within this broad Raman spectrum, relatively sharp peaks are detected, indicative of nanocrystalline defects having a high strain energy within the amorphous network. Sharp D1 and D2 "defect" lines at Raman shifts of approximately 500 cm$^{-1}$ and 600 cm$^{-1}$ appear in the Raman spectra of bulk vitreous silica. The intensity of these defect lines increases with the concentration of the nanocrystalline defects.

Nanocrystalline defects form scattering centers in an optical fiber and increase fiber attenuation. These structural defects also induce added loss upon exposure to hydrogen or ambient radiation, as they are more prone to color center formation. High-speed fiber draw, especially at a low draw temperature, further increases the number of these nanoscale crystalline defects, resulting in a higher attenuation. Attempts to reduce such structural defects require fiber drawing at low speeds, but this incurs a higher fiber manufacturing cost. Therefore, it is desirable to reduce the concentration of nanoscale crystalline structural defects, particularly in the fiber core.

Raman spectral measurements in an optical fiber provide direct measurements of nanocrystalline defects at the fiber core (i.e., within the portion of the fiber that carries greater than 80% of the optical transmission power). The type and concentration of the nanocrystalline defects are affected by the glass composition of the fiber core, as well as processing conditions during preform fabrication (e.g., ambient and temperature during densification and consolidation, including tube collapse) and during fiber draw (e.g., draw tension, speed and temperature). Therefore, Raman spectral measurements on the nanocrystalline defects provide the most relevant data on the optical performance of a transmission fiber.

Figure 7:
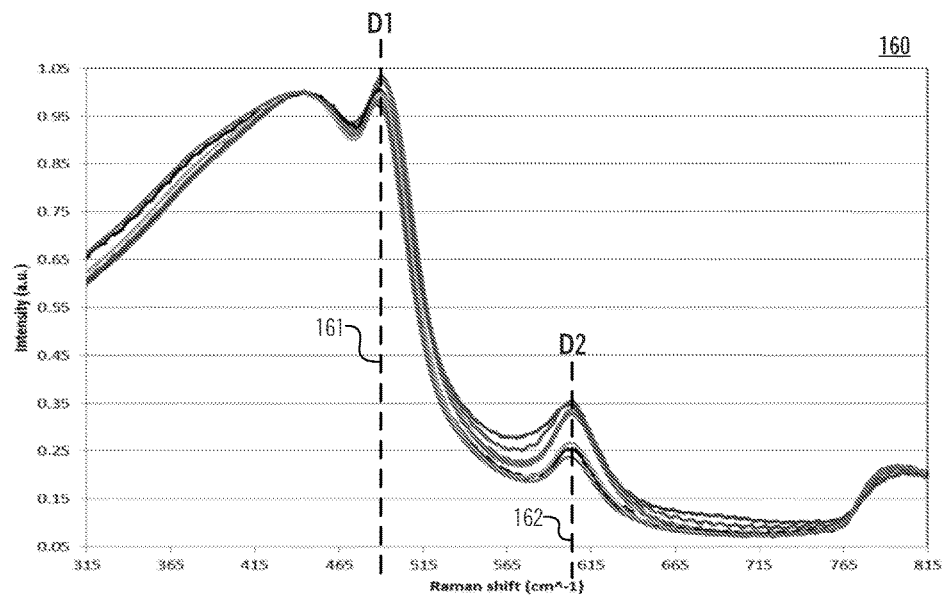
FIGS. 7 and 8 show Raman spectra measured in two groups of fibers: a first group having cores doped with halogen dopants, and a second group having cores doped with both halogen and alkali dopants.
Figure 8:
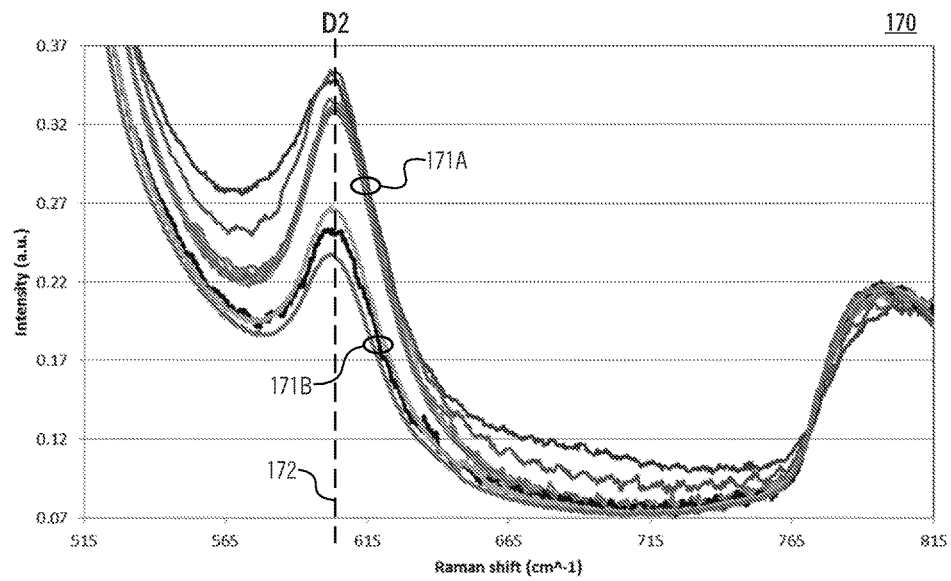

FIGS. 7 and 8 show Raman spectra 160, 170 measured in 13 different optical fibers, each belonging to one of two groups: Group A, in which the fiber cores were doped with halogen dopants; and Group 3, in which the fiber cores were doped with both halogen and alkali dopants. FIG. 7 shows both the D1 defect line 161 and the D2 defect line 162. FIG. 8 focuses on the D2 defect line 172.

The Raman spectral measurements in FIGS. 7 and 8 show that typical silica-core fibers have relatively large D2 intensities. The D2 line in the Raman spectra is caused by the symmetric stretching of the regular nanoscale crystalline planar three-fold ring defects imbedded within the amorphous network.

In FIG. 7, Raman scattering intensities in different fibers were measured versus the frequency downward shift upon excitation at a wavelength of 1.55 μm. Raman spectra from different fibers were normalized against their respective peak heights at the $\omega_1$ main line around 440 cm$^{-1}$.

FIG. 8 shows the Raman spectra between frequency shifts between 515 cm$^{-1}$ and 815 cm$^{-1}$ in order to more clearly show the intensity levels around the D2 defect line. In FIG. 8, it can be seen that, at the D2 defect line, there is a readily identifiable difference between the respective intensities of the fibers in Group A (i.e., the upper group of traces 171A) and the intensities of the fibers in Group B (i.e., the lower group of traces 171B). The difference between the two groups of fibers is indicative of the different concentrations of nanocrystalline defects in these fibers. Thus, for the purposes of the present discussion, the concentration of nanocrystalline defects in a given fiber is quantified using the intensity level at the D2 defect line in that fiber's Raman spectrum.

FIG. 9 is a table 180 showing the integrated D2 line intensity in the fibers in Group A and Group B. (The technique used to quantify the integrated D2 line intensities, and therefore the respective concentrations of nanoscale crystalline core defects, is described below in the section entitled "Methodology.")

The Group A fibers, containing halogen core dopants, have an integrated D2 line intensity of 0.04. The Group B fibers, containing both alkali and halogen core dopants, have an integrated D2 line intensity of 0.022-0.026. Thus, the integrated D2 line intensity of the Group B fibers is approximately 60% (±5%) of the integrated D2 Line intensity of the Group A fibers.

FIG. 10 shows a graph 190, in which plot 191 illustrates the general correlation between fiber attenuation at 1550 nm and D2 defect line intensity. It is observed that fibers having a structurally homogeneous core (e.g., the fibers in Group B) tend to have lower fiber attenuation.

The nanoscale structurally homogenous core in Group B fibers is achieved by adding alkali and halogen co-dopants into the fiber core, where more than 70% of optical power propagates. Because of the increased homogeneity of their cores, the group B fibers display a substantially reduced D2 line intensity, as shown in FIG. 8.

Alkali and halogen dopants in the fiber core have an ionic charge valence of +1 and −1 respectively. These charged alkali and halogen dopants disrupt the planar three-fold ring structures by relieving the strain energy and restoring the O—Si—O bond angles to the higher bond angles very similar to those in the stable tetrahedron network in amorphous silica. The bond angle relaxation relieves the strain energy within the planar defects resulting in lower scattering and therefore lower attenuation of optical signals propagating in the fiber core.

In addition to their ionic charge, the ionic size of the alkali and halogen dopants also plays a role in removing the nanoscale crystalline defects.

FIG. 11 shows a table 200 that lists the ionic radius and charge for alkalis and halogens. Table 200 lists the "crystal" ionic radii, which corresponds more closely to the physical size of ions in a solid.

A small quantity (e.g. <4,000 ppm) of most alkali can be introduced into silica without causing devitrification (i.e., crystallization). Of the halogens, only fluorine and chlorine can be readily doped in silica in significant concentrations.

Based on the matching ionic radii of the alkali and halogen co-doping, it is preferable to co-dope the following alkali-halogen combinations in a silica core to remove nanocrystalline defects:

(1) potassium (K)+chlorine (Cl)
(2) rubidium (Rb)+chlorine (Cl)
(3) sodium (Na)+fluorine (F)

While this suggests that approximately equal molar concentrations of alkali and halogen dopants are preferable for charge balance, an excess halogen dopant concentration can be beneficial in reducing glass viscosity and in increasing the glass relaxation rates to achieve a lower energy state with less atomic fluctuations, and therefore lower scattering losses.

According to an aspect of the invention, a fiber core is co-doped with a significant chlorine concentration and with a suitable alkali co-dopant. (As set forth above, suitable alkali co-dopants for chlorine include potassium and rubidium.) Much higher chlorine co-doping levels (greater than 500 ppm, and preferably more than 1,000 ppm) can be used beneficially together alkali dopant in reducing fiber attenuation.

Chlorine dopant can be used to enhance fiber design flexibility versus the use of fluorine dopant. It is because the chlorine doping at the silica fiber core increases the refractive index whereas fluorine doping decreases the core index. In particular, 10,500 ppm chlorine increases the silica refractive index by 0.001 Δn and 3,450 ppm fluorine dopant decreases the silica index by 0.001 Δn. For a given cladding refractive index, chlorine doping increases the optical power within the core region and can therefore be used, for example, to reduce the macrobending losses. There are many such examples well known to the fiber designer in which it is desirable for a dopant to increase the refractive index of the glass. Likewise, in some instances it is desirable to use F to improve the structural homogeneity of the glass, such as in regions with reduced refractive index.

Furthermore, chlorine doping, especially by means of oxygen-free $SiCl_4$, has additional advantages in dehydration and purification. Firstly, the aggressiveness of $SiCl_4$ reaction with $SiO_2$ surface molecules enables the incorporation of high levels of chlorine concentrations into the silica matrix. This also yields an advantage in purification of OH, transition metals, and other contaminants. A typical reaction might be written in a form to emphasize the oxidation product $SiO_2$:

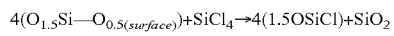

$$4(O_{1.5}Si\text{—}O_{0.5(surface)}) + SiCl_4 \rightarrow 4(1.5OSiCl) + SiO_2$$

In addition, the advantage of higher chlorine incorporation will further assist purification by reacting with OH, impurity metalloids, and metal oxides, to form chlorides. These chlorides have significant volatility. Therefore, the use of oxygen-free $SiCl_4$ doping enhances the well-developed purification methods of chlorine purification of silica, as well as incorporating higher levels of chlorine within the silica that can be used to advantageously modify refractive index profiles.

The reaction of $SiCl_4$ with impurity metal oxides and metalloid oxides (the most common form of impurities in a silica matrix formed by oxidation) is substitutional with respect to the oxide. Formation of the very stable $SiO_2$ yields a thermodynamic advantage in almost all cases. Examples are:

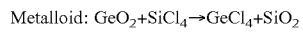

Metalloid: $GeO_2 + SiCl_4 \rightarrow GeCl_4 + SiO_2$

Metal: $Fe_2O_3 + 1.5SiCl_4 \rightarrow 2FeCl_3 + 1.5\ SiO_2$

A similar advantage is gained by dehydration which is observable at room temperature with $SiCl_4$, while molecular $Cl_2$ is not effective until >800° C. Thus, a $SiCl_4$-doped silica core made by sintering the un-doped silica soot in an oxygen-free $SiCl_4$ ambient can result in very low OH content in the resultant fiber; and the OH peak in such fibers can be less than 0.33 dB/km at a wavelength of 1385 nm.

The overall dehydration reaction using $SiCl_4$ is given as:

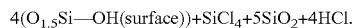

$$4(O_{1.5}Si\text{—}OH(surface)) + SiCl_4 + 5SiO_2 + 4HCl.$$

As discussed below in the "methodology" section, the alkali dopant concentration can be characterized by the peak concentration in the fiber core center or the concentration radially averaged within the core radius; and such concentration quantities reported in the fiber can be estimated from the measurements made in the preform using experimentally determined scale factors, $1/\beta i$.

As further discussed below, it is more appropriate to characterize the halogen dopant concentration by the concentration radially averaged within the fiber core radius since the halogen concentration may not have the maximum value at the preform and fiber core center. Furthermore, the average dopant concentration reported in the fiber can be estimated from the measurements reported in the preform using experimentally determined scale factors, $1/\beta i$.

Figure 12:
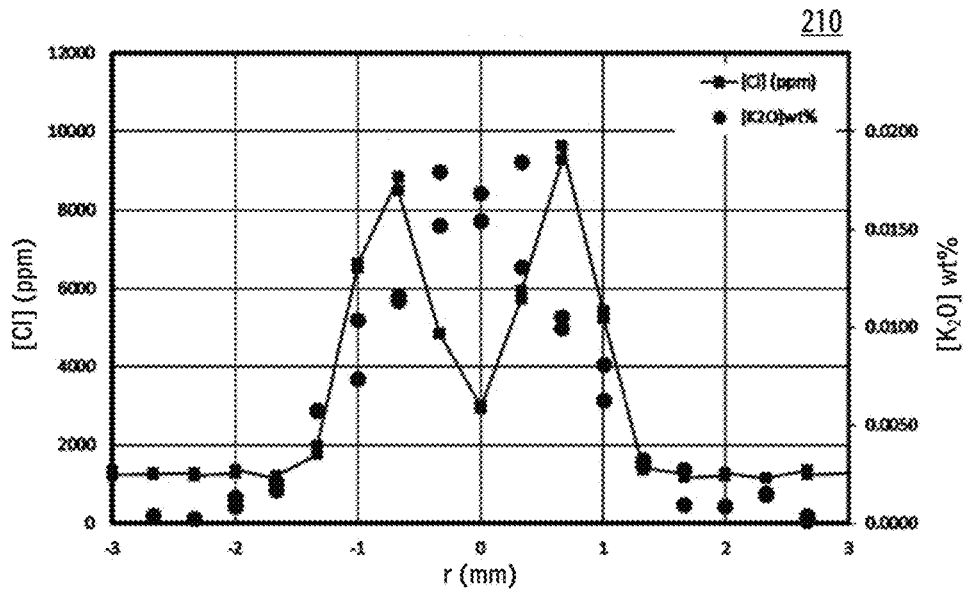
FIGS. 12 and 13 show potassium and chlorine dopant concentration versus preform radial position for two exemplary preforms containing relatively low K-dopant concentration.
Figure 13:
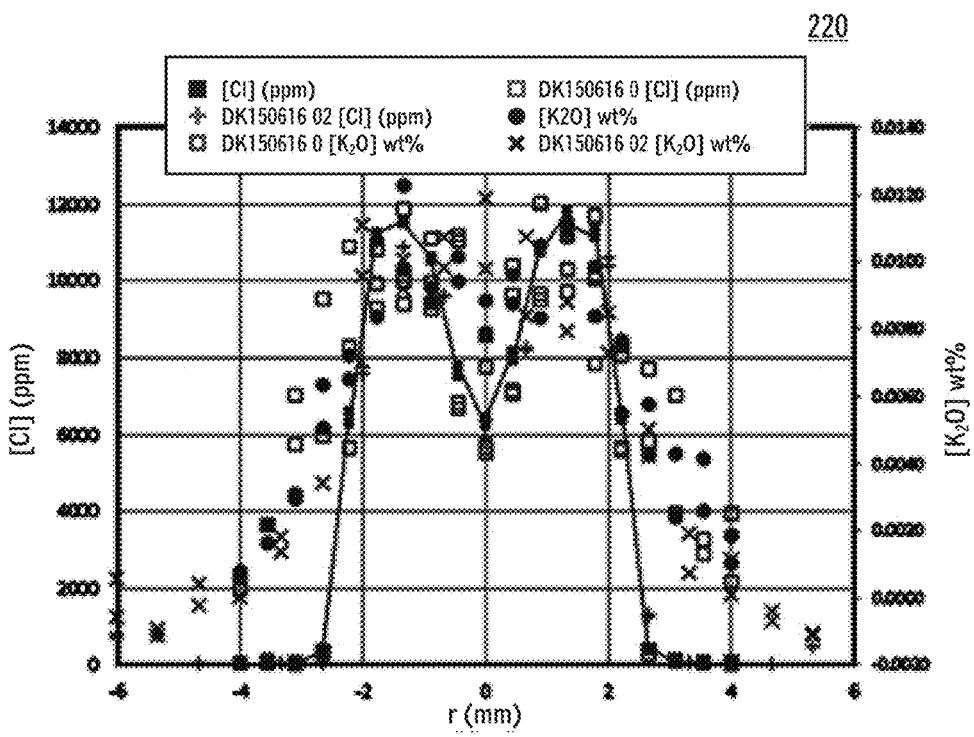

FIGS. 12 and 13 are a pair of graphs 210, 220 that show potassium and chlorine dopant concentration versus preform radial position for two exemplary preforms containing relatively low K-dopant concentration (i.e., less than 200 ppm peak concentration). In each graph 210, 220 the potassium concentration is plotted on the right vertical scale and the chlorine concentration on the left scale.

Figure 14:
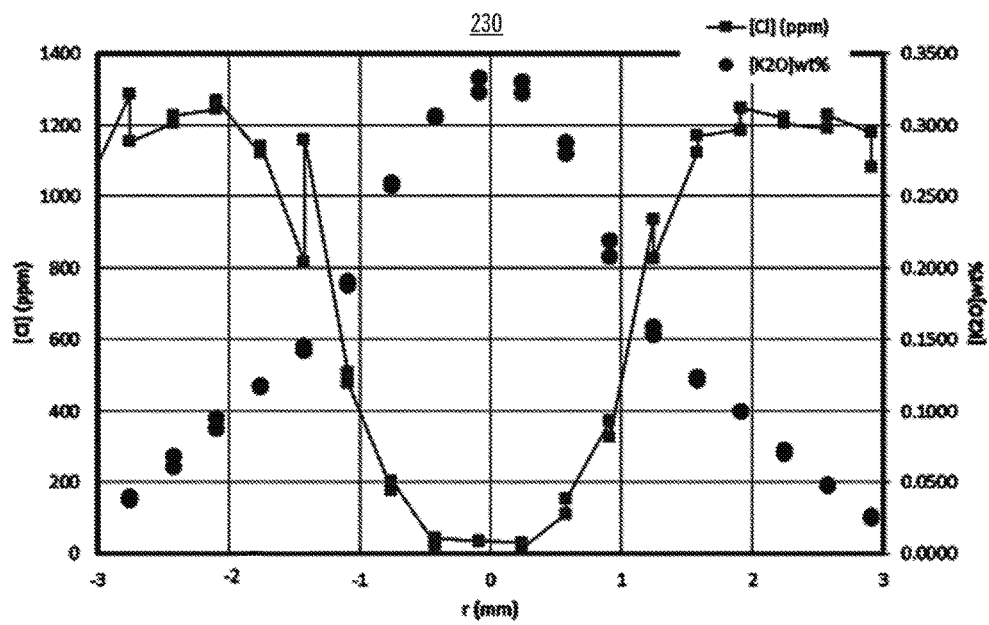
FIGS. 14 and 15 show potassium and chlorine dopant concentration versus preform radial position for two exemplary preforms containing relatively high K-dopant concentration.
Figure 15:
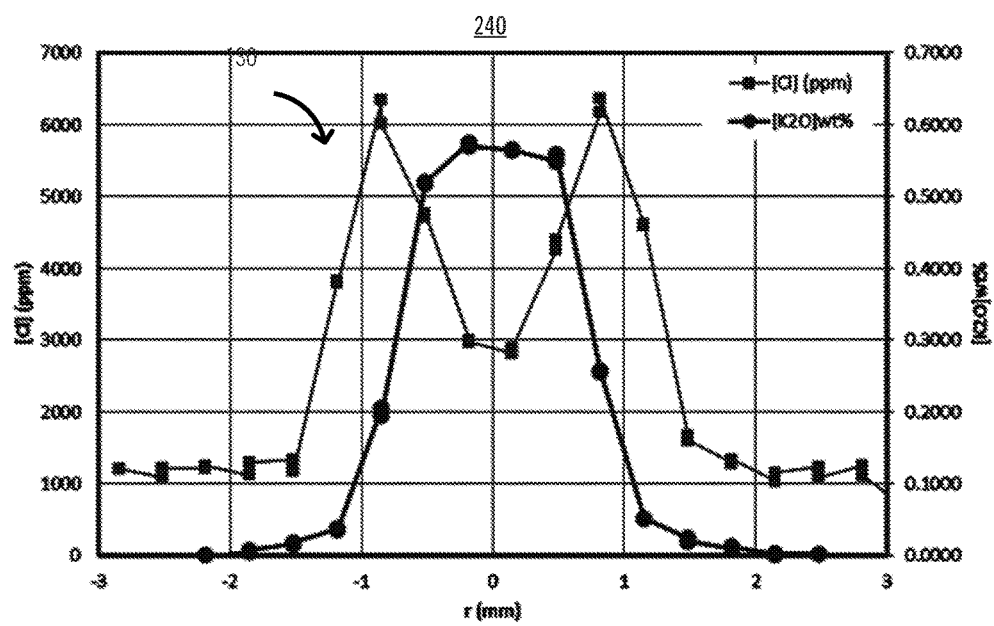

FIGS. 14 and 15 are a pair of graphs 230, 240 that show potassium and chlorine dopant concentration versus preform radial position for two exemplary preforms containing relatively high K-dopant concentration (i.e., more than 3,000 ppm peak concentration). In each graph, the potassium concentration is plotted on the right vertical scale and the chlorine concentration on the left scale.

In a fiber according to the present invention, the desirable upper limits on the alkali and halogen dopant concentration are determined by silica devitrification, which increases scattering losses.

Figure 16:
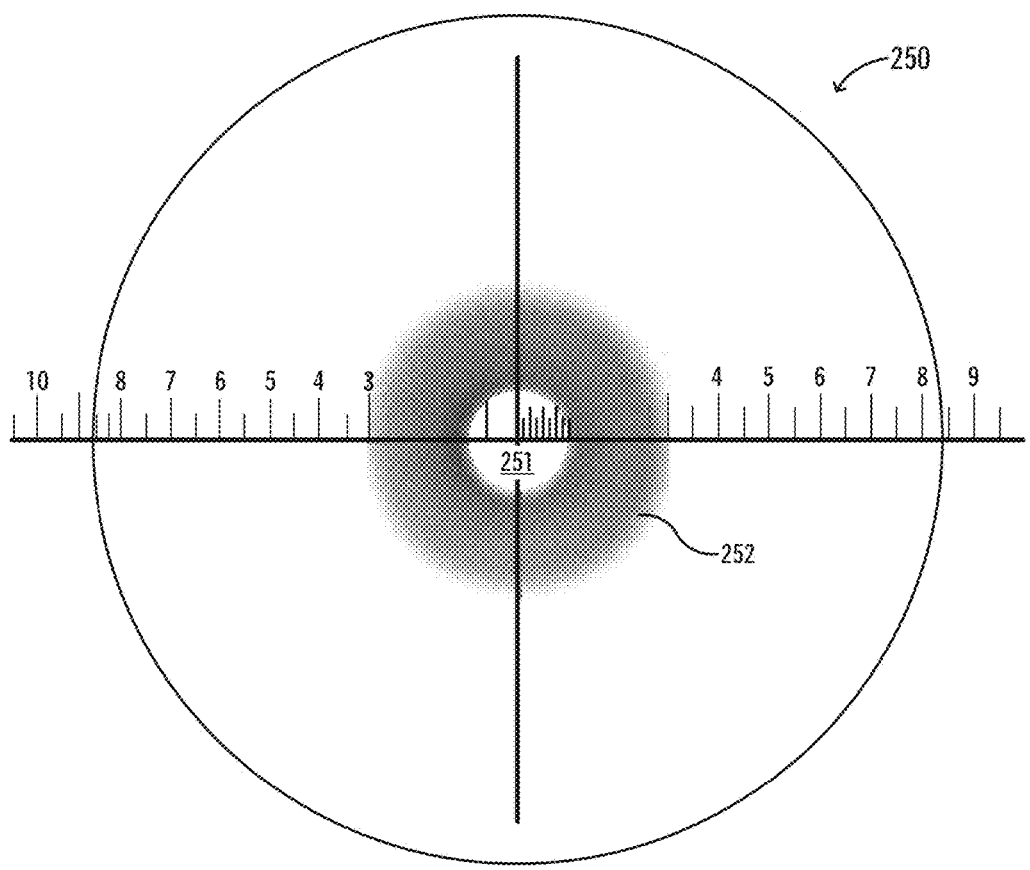
FIG. 16 shows a micrograph of a preform sample, for which the chlorine and potassium dopant concentrations are plotted in FIG. 14.

It is interesting to note the effects of potassium and chlorine concentrations on silica devitrification. FIG. 16 shows a micrograph 250 of a preform sample, for which the chlorine and potassium dopant concentrations are plotted in FIG. 14. While this sample has about 3,400 ppm $K_2O$ peak concentration at the core center, the central region 251 remains transparent without devitrification mainly because chlorine at the same region was depleted to <100 ppm by the potassium doping process. However, the clear central region 252 is surrounded by a devitrified region 252, which appears as a dark ring because of light scattering. In the devitrified region, the potassium concentration is approximately 2,000 ppm while the chlorine concentration is about approximately 800 ppm. This observation on silica devitrification establishes the upper limit of the potassium doping concentration at about 2,000 ppm. This upper limit is increased by reducing the chlorine concentration.

Experimental data shows that alkali dopant makes a significant change in the residual axial stress in the fiber core and adjacent regions when the preform is drawn into fiber.

FIG. 17A is a graph 260 in which trace 261 shows refractive index as a function of radial position in an alkali-free fiber. FIG. 17B is a graph 270 in which trace 271 shows the fiber's axial stress profile as a function of radial position.

FIG. 18A is a graph 280 in which traces 281 and 282 show refractive index as a function of radial position in a pair of fibers in which K-dopant was deposited in the center of the preform from which the fiber was drawn. Traces 281 and 282 show, respectively, the refractive index profile of a first fibers drawn at an applied tension of 34 gm and a second fiber drawn at an applied tension of 122 gm. FIG. 18B is a graph 290, in which traces 291 and 292 show the axial stress profile as a function of radial position for the first and second fibers.

As shown in FIG. 17B, a tensile (i.e., positive) stress is found in the core region of an alkali-free fiber. As shown in FIG. 18B, a compressive (i.e., negative) stress is found in an alkali-doped fiber. More significantly, the radial width of the compressive stress profile in an alkali-doped fiber extends much further than the originally doped region upon scaling from the preform dimension.

As shown in FIG. 18B, in K-doped fibers the axial compressive stress extends to a radius of approximately 25 μm, or approximately 5 times the core radius in both a fiber drawn at 34 gm and the same fiber drawn at 122 gm. The radial extension of the compressive stress fibers arises as a result of dopant diffusion mainly during fiber draw.

During the transformation process from preform to fiber, the relative radial extent of alkali dopant distribution increases about 5 times. Therefore, it is expected that the alkali concentration in the drawn fiber is approximately 25 times less than that in the preform.

As discussed below in the "Methodology" section, β≈25 for potassium. Consequently, the potassium concentration in fibers drawn from preforms shown in FIG. 12-15 can be 25 times lower than those measured in the preforms. The concentration and radial extend of K doping in the fiber, as with any dopant, depends on the degree of diffusion in the glass and is therefore affected by thermal history, initial doping spatial profile in the preform and glass composition.

Furthermore, a residual axial compressive stress with a sufficient magnitude more than 20 MPa together with the stress radial extent preferably 1.2 times, and more preferably 2 times the core radius results in good structural homogeneity in the core and adjacent regions critical for optical transmission performance because a significant optical power propagate in this radial range. The lower limit in the radial extent of the compressive stress is defined by the need to ensure most of the optical power propagates in the structurally homogeneous and therefore low attenuation regions. Since different fiber designs have different spatial power distributions, the compressive stress profile should have a lower radial limit within which more than 99%, and preferably more than 99.9%, of the total optical power propagates.

The upper limit in the radial extent of the compressive stress is determined by several factors. Firstly, there is no significant advantage in reducing the optical attenuation by extending the compressive stress region to the radial region in which little optical power propagates. Secondly, the axial compressive stress region should not extend too widely that is indicative of too much alkali dilution due to alkali diffusion to a large radius during fiber processing. Thirdly, it is known that after the draw tension is released, axial stress, σz, equilibrium is established throughout the fiber cross section such that the axial compressive stress in the core central region must be balanced by the axial tensile stress in the outer cladding region, i.e.

$$\int_0^R \sigma_z r dr = \int_0^{R_1} \sigma_z r dr + \int_{R_1}^R \sigma_z r dr = 0$$

where compressive stress is between r=0 and r=R1; and tensile stress is between r=R1 and r=R=cladding radius.

By increasing R1 and for a given compressive stress within r<R1, it is expected that a higher tensile stress at the outer cladding resulting in a lower mechanical strength of the optical fiber. This consideration also imposes an upper limit on the radial extent of the axial compressive stress region.

Figure 19:
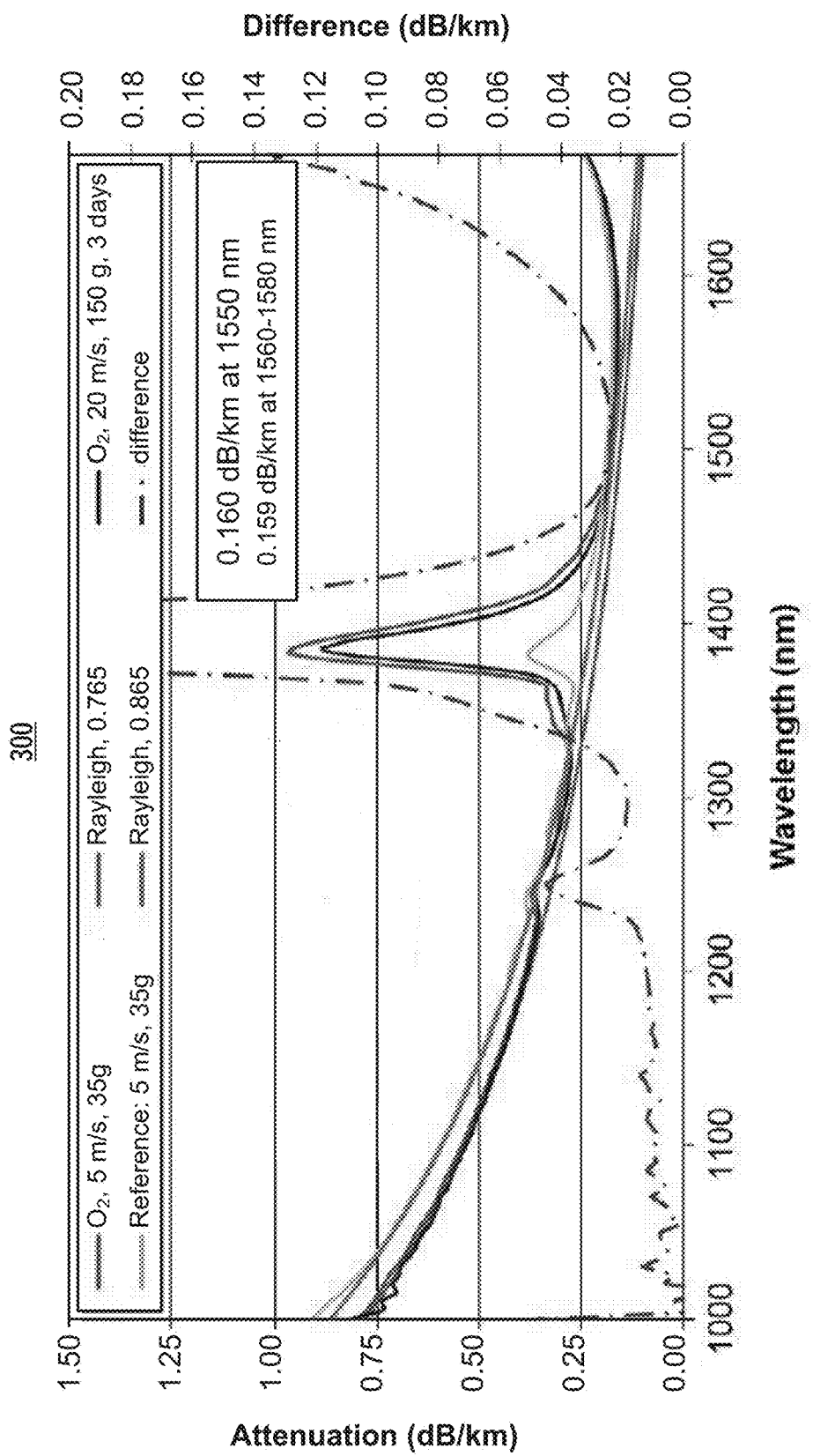
FIG. 19 shows the spectral loss of a fiber doping with potassium in the core region resulting in a reduced concentration of nanoscale crystalline defects.

FIG. 19 is a graph 300 that shows the spectral loss of a fiber doped with potassium in the core region, resulting in a reduced concentration of nanoscale crystalline defects. The fiber has an attenuation of 0.16 dB/km at 1550 nm, and an attenuation of 0.159 dB/km between 1560 and 1580 nm.

Due to the aliovalency of phosphorus ($P^{3+}$ or $P^{5+}$) relative to silicon ($Si^{4+}$) and its ionic radius (58 pm for $P^{3+}$, and 52 pm for $P^{5+}$) matching rather closely with the 54 pm ionic radius of $Si^{4+}$, phosphorus dopant addition in the fiber core also reduces the concentration of nanoscale crystalline defects as indicated by a lower D2 line intensity. However, since phosphorus oxide has an infrared absorption edge at a shorter wavelength than silica, a high phosphorus dopant concentration introduces added loss at communication wavelengths, especially between 1.3 μm and 1.55 μm. Therefore, phosphorus dopant concentration between 0.2% and 2% is the optimal balance between the D2 defect reduction and the attenuation increase from the infrared loss edge.

It will be seen that viscosity-matching techniques according to aspects of the invention exploit the fact that alkali dopants reduce the silica viscosity over a large radial range from the initial doping location. For example, FIGS. 18A-B show that the compressive axial stress extending to about 5 times the fiber core radius even though potassium was deposited only within the preform core region.

FIGS. 20-23 are a series of diagrams of an optical fiber 310 according to a further aspect of the invention. FIGS. 20 and 21 show, respectively, side and front views of the fiber 310; FIG. 22 shows an exemplary index profile 320 for the fiber; and FIG. 23 shows a table 330 setting forth for each fiber region the following parameters: outer radius, index difference, viscosity ranking prior to alkali doping, a first exemplary alkali doping scheme; and a second exemplary alkali doping scheme.

Fiber 310 comprises five concentric regions layered on top of each other: a core region 311A, a pedestal region 311B, an inner trench 311C, an outer trench 311D, and an outer cladding 311E (corresponding to the following regions of index profile 320: up-doped core 321A, either undoped or slightly doped pedestal 321B, down-doped inner trench 321C, down-doped outer trench 321D, and cladding 321E). According to an aspect of the invention, a low attenuation is achieved by using alkali doping to create viscosity matching, during fiber draw, among the fiber's radial regions 311A-311E.

Prior to alkali doping:

Region 311A contains a non-alkali dopant (e.g., a halogen), which reduces its viscosity (to rank 3), and increases its core index.

In an exemplary design, region 311B does not contain much dopant, and has a higher viscosity (rank 5) than adjacent regions 311A and 311C. In alternative designs, region 311B is doped with a halogen (e.g., fluorine) that reduces the refractive index and also silica viscosity prior to alkali doping.

Regions 311C (viscosity rank 1), 311D (viscosity rank 2) and 311E (viscosity rank 3) contain different concentrations of F-dopants. Silica viscosity decreases monotonically with a higher F-concentration.

In a first alkali doping scheme:

Region 311B is doped with a significant concentration of alkali, resulting in a lower viscosity to match those in Regions 311A and 311C. (The viscosity-reducing effects of alkali doping are most pronounced in Region 311B, which has a high viscosity prior to doping. However, alkali doping is less effective in further reducing the viscosity of Regions 311C and 311A, which have already been softened from the presence of other dopants.)

In those practices of the invention in which region 311B already contains halogen doping (e.g., fluorine) prior to alkali doping, a lower alkali doping concentration will be needed to achieve viscosity matching.

Region 311A contains a small amount of alkali by intentional doping and by alkali diffusion during preform processing and fiber draw.

Region 311C contains a trace amount of alkali mainly by alkali diffusion during fiber draw.

Regions 311D and 311E do not have much alkali doping. (Viscosity matching during fiber draw between Regions 311D and 311C does not have much impact on attenuation and on other optical properties because very little optical power propagates at the interface between these regions.)

In a second exemplary alkali doping scheme:

Regions 311A and 311B are doped with a significant amount of alkali, resulting in a lower viscosity to match the viscosity of Region 311C.

In those practices of the invention in which region 311B already contains halogen doping (e.g., fluorine) prior to alkali doping, a lower alkali doping concentration will be needed to achieve viscosity matching.

Region 311C contains a trace amount of alkali, mainly resulting from alkali diffusion during fiber draw.

Regions 311D and 311E do not have much alkali doping.

FIG. 24 shows a table that sets forth a number of exemplary core doping schemes in accordance with aspects of the invention discussed above.

In exemplary doping scheme 1, a fiber core is doped with fluorine (0 ppm to 150,000 ppm), chlorine (0 ppm to 15,000 ppm), and phosphorus (0.2% to 2%)

In exemplary doping scheme 2, a fiber core is doped with potassium (5 ppm to 2,000 ppm) chlorine (100 ppm to 15,000 ppm), and phosphorus (0% to 2%).

In exemplary doping scheme 3, a fiber core is doped with rubidium (5 ppm to 2,000 ppm), chlorine (100 ppm to 15,000 ppm), and phosphorus (0% to 2%).

In exemplary doping scheme 4, a fiber core is doped with sodium (5 ppm to 2,000 ppm), fluorine (100 ppm to 15,000 ppm), and phosphorus (0% to 2%).

Methodology

Quantification of the D3 Defect Line Intensity

There is now described the methodology used to quantify the D2 defect line intensity.

The intensity of D2 defect line can be quantified by de-convoluting the Raman spectrum measured around the D2 frequency shift into the individual Gaussian, Lorentzian and polynomial spectral components.

Figure 25:
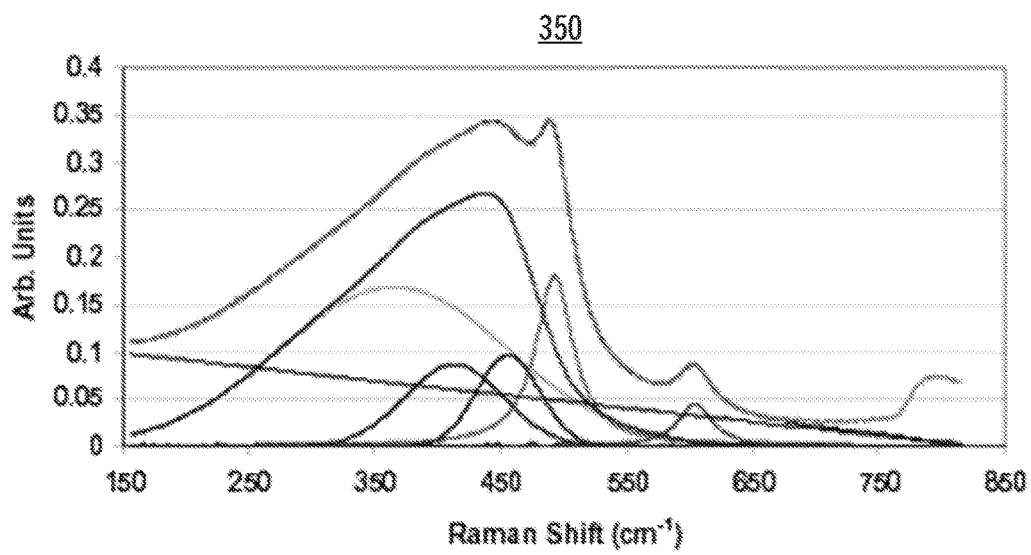
FIGS. 25 and 26 show an example of Raman spectra deconvolution into individual Gaussian, Lorentzian and polynomial spectral components to determine the D2 defect line intensity.
Figure 26:
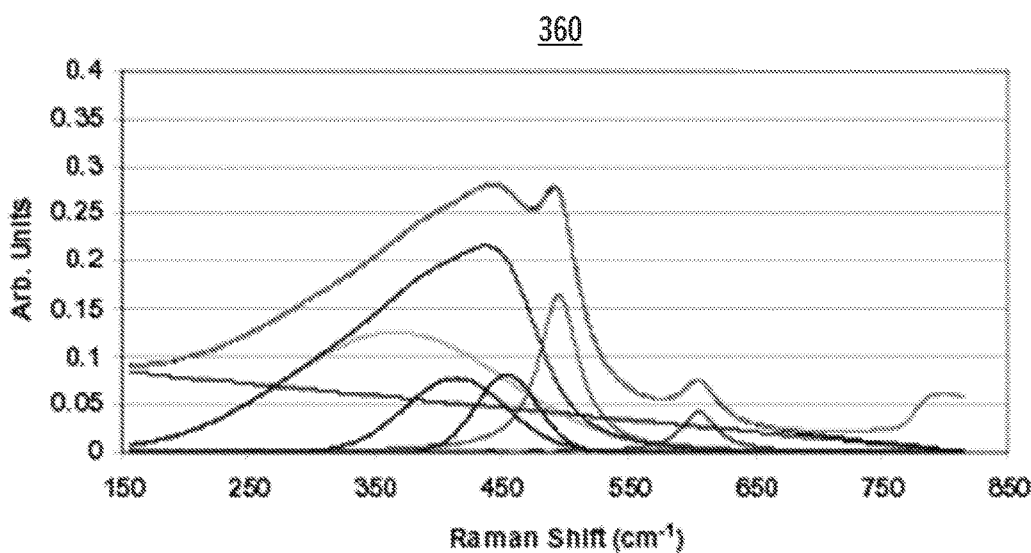

FIGS. 25 and 26 are a pair of graphs 350, 360 showing an example of Raman spectra deconvolution into individual Gaussian, Lorentzian and polynomial spectral components to determine the D2 defect line intensity. The D2 line intensity is given by the integrated intensity of the line shape best-matching the D2 frequency shift.

Alternately, the intensity of the D2 defects can be quantified by $$\delta I = \int_{f_1}^{f_2} [I(f) - I_o(f)] df$$

where I(f) is the intensity of Raman scattering at frequency shift, f; and I(f) is the scattering intensity extrapolated from the adjacent frequency regions to give the background Raman scattering intensity. The integration interval, $f_2-f_1$, is the range of frequency shift in which $I(f) > I_O(f)$ in the integrand of the above equation.

In order to provide a consistent measure of the D2 line defect intensity, the above $\delta 1$ value is normalized with respect to the broad Raman spectrum of the same fiber.

Quantification of Dopant Concentration

Because a preform has an outer diameter that is much larger than that of a fiber drawn from the preform, dopant concentration measurements in a preform typically give more accurate data than measurements in the drawn fiber. The average dopant concentration of a given dopant is conserved because dopants are deposited near the preform center, and because at all conceivable thermal histories the deposited dopants do neat evaporate from the preform or fiber.

In particular, the average concentration of a given dopant in the preform is same as that in the fiber, i.e.:

$$\int_0^{R_1} \frac{C_i(r_1)}{R_1^2} r_1 dr_1 = \int_0^{R_2} \frac{C_i(r_2)}{R_2^2} r_2 dr_2$$

where Ci is the concentration of dopant type i; $r_1$ and $r_2$ refer to the radial positions of the preform and fiber respectively; and $R_1$ and $R_2$ are the preform and fiber clad radius respectively.

While the average dopant concentration throughout the fiber is same as that throughout the preform, their dopant distributions can be very different due to dopant diffusion. For optical fiber applications, our primary interest is the quality of the fiber core region through which most optical power propagates. The average dopant concentration within the fiber core radius, a, is most relevant in the fiber transmission quality. The following equation shows that the dopant concentration within the fiber core is related to the concentration within the preform core radius R by a factor, $1/\beta i$.

$$\int_0^a \frac{C_i(r_1)}{a^2} r_1 dr_1 = \frac{1}{\beta_i} \int_0^R \frac{C_i(r_2)}{R^2} r_2 dr_2$$

When dopant diffusion occurs for a very short time at a small diffusivity, it is expected that $\beta i \approx 1$. However, $\beta i$ approaches a very large value after dopant diffusion for a very long time at a fast diffusivity.

As shown in FIGS. 12-15, the peak alkali dopant concentration usually occurs at the preform core center, $r_2 = 0$; and we expect the fiber core center, $r_1 = 0$, also has the maximum alkali dopant concentration. We note that the peak optical power and the peak alkali dopant concentration both occur at the fiber core center. To the first approximation, the alkali dopant concentration at the fiber core center is related to that at the preform core center by the following relation:

$$C_i(r_i = 0) \approx \frac{C_i(r_2 = 0)}{\beta_i}$$

Therefore, the alkali dopant concentration can be characterized by either the average alkali concentration within the fiber core or the peak alkali concentration at the fiber core center.

For a given dopant and fiber draw condition, the scale factor, $1/\beta i$, can be determined experimentally to correlate the dopant concentration within the fiber core versus that measured within the preform core.

FIGS. 12-15 show that the peak halogen dopant concentration does not necessarily occur at the preform core center, $r_2=0$, mainly because of halogen dopant depletion possibly by the consolidation ambient, e.g. oxygen. Since we cannot expect the maximum halogen dopant concentration at the fiber core, it is more appropriate to characterize the halogen dopant concentration by the average halogen concentration within the fiber core.

Conclusion

While the foregoing description includes details that will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. An optical fiber, comprising:
a plurality of concentric fiber regions, including a core region and surrounding cladding regions, wherein the concentric fiber regions are doped with one or more index-modifying dopants in respective amounts and radial positions that are configured to create a selected index profile with radial regions supporting optical propagation through the fiber,
wherein the core region is doped with viscosity-reducing dopants in respective amounts and radial positions that are configured to result in viscosity matching among the fiber's radial regions supporting optical propagation through the fiber, such that, in a Raman spectrum with a frequency shift of approximately 600 cm$^{-1}$, the fiber has a nanoscale structure having an integrated D2 line defect intensity of less than 0.025.

2. The optical fiber of claim 1,
wherein the core region is doped with one or more viscosity-reducing dopants in respective amounts and radial positions that are configured such that the fiber has an attenuation of less than 0.18 dB/km at 1550 nm.

3. The optical fiber of claim 1,
wherein the core region is doped with one or more viscosity-reducing dopants in respective amounts and radial positions that are configured such that the fiber has an attenuation of less than 0.17 dB/km at 1550 nm.

4. The optical fiber of claim 1,
wherein the fiber is drawn at a speed of greater than 3 meters per second.

5. The optical fiber of claim 1,
wherein the core region is doped with amounts of P, Cl and F dopants,
wherein the amount of P dopant is between 0.2% and 2%,
wherein the amount of Cl dopant is between 0 and 15,000 ppm, and
wherein the amount of F dopant is between 0 and 150,000 ppm.

6. The optical fiber of claim 1,
wherein the core region is doped with amounts of alkali, halogen and phosphorus co-dopants.

7. The optical fiber of claim 6,
wherein the core region is doped with amounts of K, Cl, and P dopants,
wherein the amount of K dopant is between 5 and 2,000 ppm,
wherein the amount of Cl dopant is between 100 and 15,000 ppm, and
wherein the amount of P dopant is between 0% and 2%.

8. The optical fiber of claim 6,
wherein the core region is doped with amounts of Rb, Cl and P dopants,
wherein the amount of Rb dopant is between 5 and 2,000 ppm,
wherein the amount of Cl dopant is between 100 and 15,000 ppm, and
wherein the amount of P dopant is between 0% and 2%.

9. The optical fiber of claim 6,
wherein the core region is doped with amounts of Na, F, and P dopants,
wherein the amount of Na dopant is between 5 and 2,000 ppm,
wherein the amount of F dopant is between 100 and 15,000 ppm, and
wherein the amount of P dopant is between 0% and 2%.

10. An optical fiber, comprising:
a plurality of concentric regions, including a core region and surrounding cladding regions that are doped with one or more index-modifying dopants in respective amounts and radial positions that are configured to create a selected index profile,
wherein the core region is doped with one or more viscosity-reducing dopants in respective amounts and radial positions that are configured such that the fiber has a residual axial compressive stress with a stress magnitude of more than 20 MPa and a stress radial extent between 2 and 7 times the core radius, and such that, in a Raman spectrum with a frequency shift of approximately 600 cm$^{-1}$, the fiber has a nanoscale structure having an integrated D2 line defect intensity of less than 0.025.

11. The optical fiber of claim 10,
wherein the core region is doped with one or more viscosity-reducing dopants in respective amounts that are configured such that the fiber has an attenuation of less than 0.18 dB/km at 1550 nm.

12. The optical fiber of claim 10,
wherein the core region is doped with one or more viscosity-reducing dopants in respective amounts and radial positions that are configured, such that the fiber has an attenuation of less than 0.17 dB/km at 1550 nm.

13. The optical fiber of claim 10,
wherein the fiber is drawn at a speed of greater than 3 meters per second.

14. The optical fiber of claim 10,
wherein the compressive stress has a magnitude and radial extent that are formed by an addition of alkali, halogen and phosphorus co-dopants in the core region of the fiber.

15. The optical fiber of claim 14,
wherein the core region is doped with amounts of K, Cl, and P dopants,
wherein the amount of K dopant is between 5 and 2,000 ppm,
wherein the amount of Cl dopant is between 100 and 15,000 ppm, and
wherein the amount of P dopant is between 0% and 2%.

16. The optical fiber of claim 14,
wherein the core region is doped with amounts of Rb, Cl, and P dopants,
wherein the amount of Rb dopant is between 5 and 2,000 ppm,
wherein the amount of Cl dopant is between 100 and 15,000 ppm, and
wherein the amount of P dopant is between 0% and 2%.

17. The optical fiber of claim 14,
wherein the core region is doped with amounts of Na, F, and P dopants,
wherein the amount of Na dopant is between 5 and 2,000 ppm, wherein the amount of F dopant is between 100 and 15,000 ppm, and wherein the amount of P dopant is between 0% and 2%.

* * * * *